United States Patent
Sheaf et al.

(10) Patent No.: US 8,657,569 B2
(45) Date of Patent: Feb. 25, 2014

(54) BREATHER DUCT SHIELDING

(75) Inventors: Christopher T. J. Sheaf, Derby (GB); Zahid M. Hussain, Derby (GB)

(73) Assignee: Rolls-Royce PLC, London (GB)

( * ) Notice: Subject to any disclaimer, the term of this patent is extended or adjusted under 35 U.S.C. 154(b) by 744 days.

(21) Appl. No.: 12/883,400

(22) Filed: Sep. 16, 2010

(65) Prior Publication Data
US 2011/0103941 A1 May 5, 2011

(30) Foreign Application Priority Data
Nov. 2, 2009 (GB) .................... 0919115.6

(51) Int. Cl.
*F02C 7/06* (2006.01)
*F01D 25/24* (2006.01)

(52) U.S. Cl.
USPC ...................................... 415/169.2

(58) Field of Classification Search
USPC ........ 415/108, 168.1, 169.1, 169.2, 175, 176; 244/207, 136, 53 R
See application file for complete search history.

(56) References Cited

U.S. PATENT DOCUMENTS

| | | | |
|---|---|---|---|
| 2,041,793 A | 5/1936 | Stalker | |
| 2,248,308 A * | 7/1941 | Rice | 244/135 R |
| 2,565,720 A | 8/1951 | Collison et al. | 4/111.1 |
| 2,650,781 A * | 9/1953 | Taylor | 244/198 |
| 2,836,463 A * | 5/1958 | Wilson | 239/406 |
| 3,421,577 A | 1/1969 | Valyi | |
| 3,508,561 A | 4/1970 | Cornish, III | |
| 3,525,486 A | 8/1970 | Wimpenny | |
| 3,556,444 A * | 1/1971 | Kopp | 244/135 R |
| 3,776,363 A | 12/1973 | Kuethe | |
| 4,163,366 A * | 8/1979 | Kent | 60/226.1 |
| 4,478,380 A * | 10/1984 | Frakes | 244/199.3 |
| 4,529,358 A | 7/1985 | Papell | |
| 4,749,150 A | 6/1988 | Rose et al. | |
| 4,955,565 A | 9/1990 | Coplin | |
| 5,080,303 A * | 1/1992 | Hutton | 244/53 R |
| 5,104,069 A * | 4/1992 | Reising | 244/136 |
| 5,148,989 A * | 9/1992 | Skinner | 239/171 |
| 5,552,576 A * | 9/1996 | Giamati | 219/201 |

(Continued)

FOREIGN PATENT DOCUMENTS

| | | |
|---|---|---|
| EP | 0 439 923 A1 | 8/1991 |
| EP | 0 940 338 A2 | 9/1999 |

(Continued)

OTHER PUBLICATIONS

Search Report issued in British Patent Application No. 0919110.7, on Feb. 17, 2010.

(Continued)

*Primary Examiner* — Nathaniel Wiehe
*Assistant Examiner* — Joshua R Beebe
(74) *Attorney, Agent, or Firm* — Oliff PLC

(57) ABSTRACT

A gas turbine engine comprising a nacelle and a breather duct. The breather duct provides communication between a component of the engine within the nacelle and the exterior of the nacelle and opens at an exhaust port on the external surface of the nacelle. There is at least one clean air outlet bounding the exhaust port and arranged to expel, in use, a vortical flow of clean air to form an aerodynamic barrier between the external surface of the nacelle and a flow of breather air expelled from the exhaust port.

12 Claims, 2 Drawing Sheets

(56) References Cited

U.S. PATENT DOCUMENTS

| | | | |
|---|---|---|---|
| 5,655,732 A * | 8/1997 | Frank | 244/1 R |
| 5,803,409 A | 9/1998 | Keefe | |
| 5,988,522 A | 11/1999 | Glezer et al. | |
| 6,116,015 A * | 9/2000 | Taylor et al. | 60/39.08 |
| 6,425,554 B1 * | 7/2002 | Moreland | 244/136 |
| 6,837,465 B2 | 1/2005 | Lisy et al. | |
| 7,111,809 B1 * | 9/2006 | Tai et al. | 244/135 R |
| 7,143,983 B2 | 12/2006 | McClure | |
| 7,510,149 B2 | 3/2009 | Miller et al. | |
| 7,597,288 B2 * | 10/2009 | Kwok et al. | 244/135 A |
| 7,832,689 B2 | 11/2010 | Prince et al. | |
| 8,038,102 B2 | 10/2011 | Miller et al. | |
| 8,348,199 B2 | 1/2013 | Sheaf et al. | |
| 2005/0147497 A1 | 7/2005 | Doerffer et al. | |
| 2006/0249628 A1 * | 11/2006 | Turner et al. | 244/136 |
| 2008/0149205 A1 | 6/2008 | Gupta et al. | |
| 2010/0293917 A1 * | 11/2010 | Handley et al. | 60/39.08 |

FOREIGN PATENT DOCUMENTS

| | | |
|---|---|---|
| EP | 2 065 303 A2 | 6/2009 |
| GB | 2 446 147 A | 8/2008 |
| WO | WO 2008/045074 A1 | 4/2008 |
| WO | WO 2009/025549 A1 | 2/2009 |

OTHER PUBLICATIONS

Search Report issued in British Patent Application No. 0919107.3, on Feb. 17, 2010.
Search Report issued in British Patent Application No. 0919115.6, on Feb. 15, 2010.
Search Report issued in British Patent Application No. 0908540.8, on Sep. 7, 2009.
Search Report issued in British Patent Application No. 0919118.0, on Feb. 15, 2010.
U.S. Appl. No. 12/883,553 in the name of Christopher T.J. Sheaf, filed Sep. 16, 2010.
U.S. Appl. No. 12/767,989 in the name of Christopher T.J. Sheaf, filed Apr. 27, 2010.
U.S. Appl. No. 12/883,566 in the name of Christopher T.J. Sheaf, filed Sep. 16, 2010.
Search Report issued in corresponding European Application No. 10 16 1151.5 dated Mar. 4, 2011.
Jun. 8, 2012 Office Action issued in U.S. Appl. No. 12/883,566.
Aug. 19, 2013 Office Action issued in U.S. Appl. No. 12/883,553.

\* cited by examiner

BREATHER DUCT SHIELDING

The present invention relates to shielding of a breather duct of a gas turbine engine.

Aircraft mounted gas turbine engines are usually provided with a gearbox which is driven by the engine and provides drive for certain engine accessories. Such gearboxes are oil lubricated and are provided with so-called "breather" outlets in the form of ducts which provide communication between the gearbox interior and the exterior of the engine. This is to ensure that the operation of the gearbox does not result in an air pressure build-up within the gearbox casing. Inevitably, operation of the gearbox results in severe agitation of the oil within the gearbox to the extent that an oil mist is usually formed. This oil mist can escape through the gearbox breather outlet and so it is common to provide a centrifuge device to separate out the oil mist before it is ejected from the engine. Unfortunately such devices are not completely effective in capturing all of the oil mist so that some oil is inevitably lost through the breather outlet. The magnitude of the oil loss under these circumstances is not great and does not normally present any problems in the effective operation of the gearbox. However the oil which is ejected from the breather outlet, which typically opens at a breather exhaust port which is flush with the surface of the engine nacelle, tends to cause dark coloured stains along the engine nacelle. The problem is particularly acute in the case of nacelles which have a light colour. Such stains are seen as being highly undesirable since they are unsightly and are very difficult and time consuming to remove by normal cleaning methods, causing severe customer irritation.

U.S. Pat. No. 5,080,303 discloses a breather outlet which is in the form of a mast extending outwardly from the engine nacelle, the oil/air mixture from the gearbox being exhausted from the end of the mast remote from the nacelle in a direction generally aligned with the airflow over the nacelle. This has the advantage of exhausting the oil/air mixture away from the nacelle and therefore avoids the staining. However, such masts are of bluff cross-section and cause a significant drag penalty due to shock losses as a consequence of being located in a transonic flow environment at cruise conditions. The mast is also a substantive cast metallic component which adds significant weight and cost. Both these factors penalise overall engine performance.

The present invention seeks to provide a gas turbine engine having a breather duct shield that seeks to address the aforementioned problems.

Accordingly the present invention provides a gas turbine engine comprising a nacelle and a breather duct providing communication between a component of the engine within the nacelle and the exterior of the nacelle, the breather duct opening at an exhaust port on the external surface of the nacelle, and at least one clean air outlet bounding the exhaust port and arranged to expel, in use, a vortical flow of clean air to form an aerodynamic barrier between the external surface of the nacelle and a flow of breather air expelled from the exhaust port.

This has the advantage that the vortices in the clean air flow persist as the air is directed downstream of the breather duct so that the aerodynamic barrier persists for long enough to prevent oil from the breather duct contacting and thereby contaminating the external surface of the nacelle.

The component may be an oil lubricated component. The component may be a gearbox, oil lubricated or otherwise.

The exhaust port may be circular, and the clean air outlet may Be concentric with the exhaust port.

The clean air outlet may be annular and comprise angled vanes arranged to direct, in use, clean air to be expelled as the vortical flow. Alternatively, the clean air outlet may comprise an annular array of angled outlet ducts arranged to direct, in use, clean air to be expelled as the vortical flow.

The clean air may be supplied to the clean air outlet from a bypass duct of the engine. Alternatively, the clean air may be supplied to the clean air outlet from an intake close to the exhaust port. The intake may comprise a slot, a NACA intake, or a ram scoop intake. The supply of clean air may be modulated dependent on any one or more of the following factors: the environmental conditions, the mode of engine operation and the mode of operation of the vehicle in which the gas turbine engine is used.

The present invention will be more fully described by way of example with reference to the accompanying drawings, in which.

Figure 1:
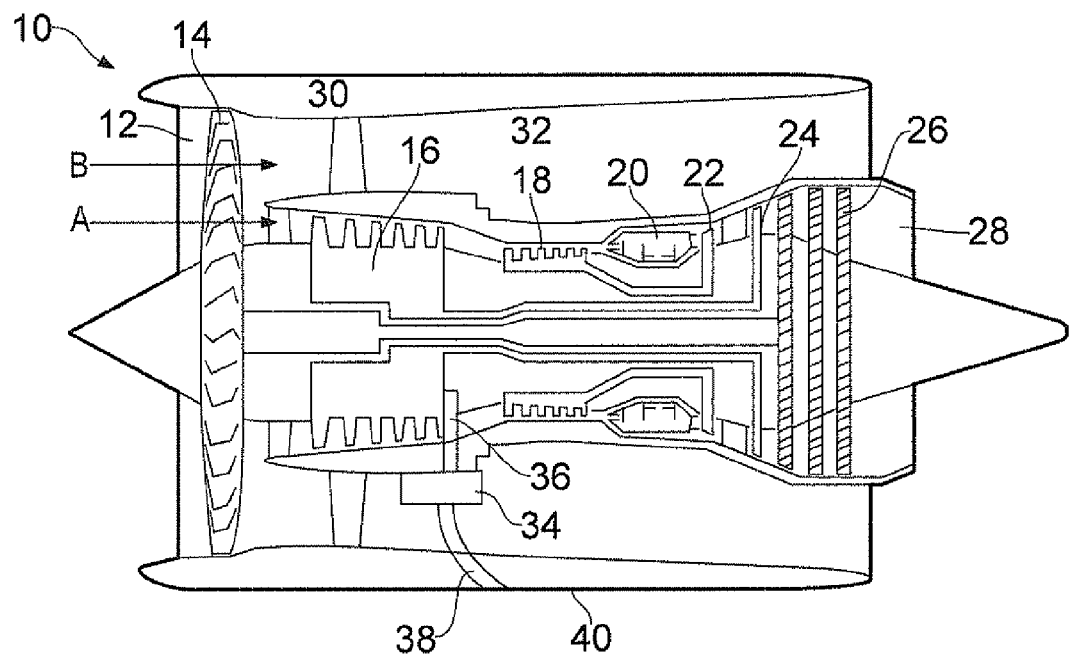
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. An oil lubricated gearbox 34 is mounted on the core engine and extracts power from the intermediate pressure compressor 16 by way of an off-take shaft 36. A breather duct 38 communicates across the bypass duct 32, between the gearbox 34 and the external surface 40 of the nacelle 30.

Figure 2:
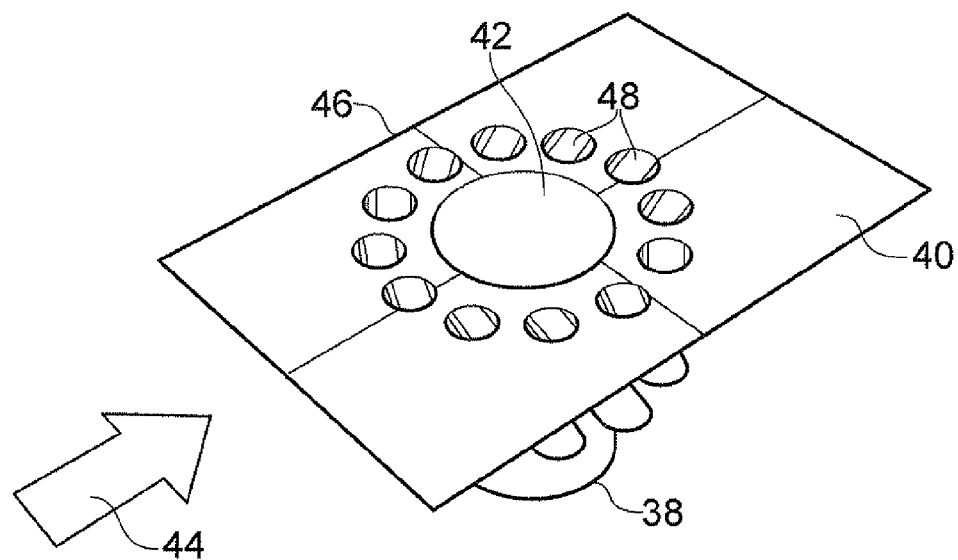
FIG. 2 is a schematic perspective view of a first embodiment of the breather duct shield in accordance with the present invention.

A first embodiment of the present invention is shown in FIG. 2 which is a perspective schematic enlargement of the external surface 40 of the nacelle 30 where the breather duct 38 breaches the surface 40. The breather duct 38 is typically a tube of circular cross-section. As described above, the breather duct 38 is designed to transport air away from the gearbox 34 to prevent air pressure build-up, but the air is often contaminated with an oil mist, despite centrifugal separation. Therefore, there is an oil/air mixture flowing through the breather duct 38 to be expelled through the exhaust port 42 forming the opening of the breather duct 38 through the external surface 40 of the nacelle 30. The oil/air mixture is expelled into an air flow past the engine 10, as indicated by arrow 44, which causes the oil/air mixture to be directed rapidly downstream of the engine 10.

The present invention provides a clean air outlet 46 that surrounds and bounds the exhaust port 42 by providing a flow of clean air to shield the external surface 40 of the nacelle 30 from the oil/air mixture. In the first embodiment, FIG. 2, the clean air outlet 46 takes the form of an annular array of angled outlet ducts 48, which are shown truncated for clarity only. The angled outlet ducts 48 are equi-angularly spaced around the breather duct 38 and may be fed individually or from a common source as will be described in more detail below. Each angled outlet duct 48 extends parallel to the axis of the breather duct 38 and is curved to form a helix or partial helix around the breather duct 38. The combination of all the angled outlet ducts 48 directs the clean air flowing therethrough to be expelled as a vortical flow that bounds the breather air expelled through the exhaust port 42 of the breather duct 38. This vortical flow forms an aerodynamic barrier or shield between the external surface 40 of the nacelle 30 and the oil/air mixture forming the breather air.

This is advantageous over the prior art breather mast since there is no physical component blocking the air flow 44 past the engine 10 and thereby causing drag penalties. Additionally the weight and cost of the cast mast is obviated, without adding weight or cost from an alternative component. Thus, overall engine performance is improved.

Figure 3:
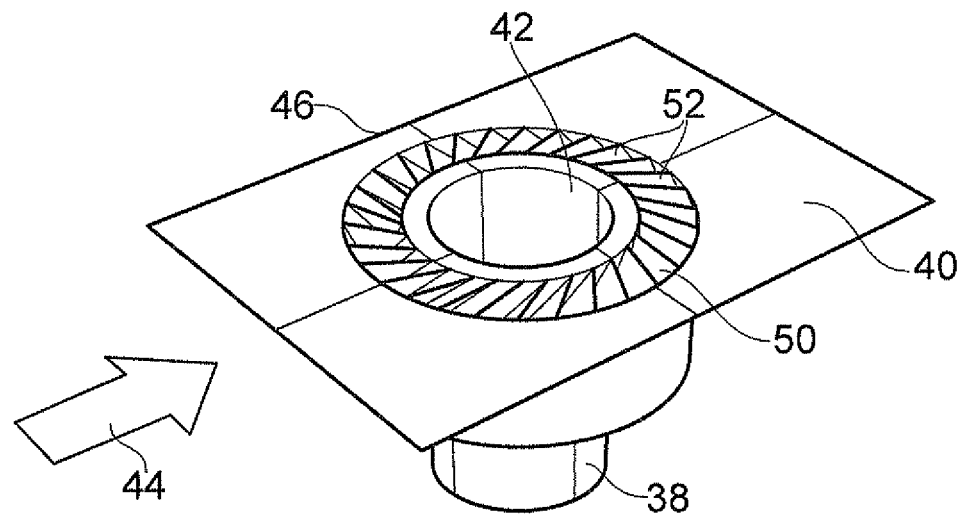
FIG. 3 is a schematic perspective view of a second embodiment of the breather duct shield in accordance with the present invention.

In the second embodiment of the present invention, shown in FIG. 3, the clean air outlet 46 takes the form of a single annular outlet duct 50 that is concentrically arranged around the breather 38. The inner wall of the annular outlet duct 50 and the outer wall of the breather duct 38 may be common in this embodiment. The annular outlet duct 50 comprises a plurality of equally spaced angled vanes 52, each of which extends across the radial width of the annular outlet duct 50 and extends parallel to the axis of the breather duct 38. Each angled vane 52 curves around the breather duct 38 so that it forms a helix or partial helix. Thus the plurality of angled vanes 52 cause the air to pass through the annular outlet duct 50 following a helical path and directs the air flow to be expelled from the annular outlet duct 50 in a vortical flow that surrounds and bounds the breather air expelled from the exhaust port 42 of the breather duct 38.

Using vortical flow as the aerodynamic barrier around the expelled breather air is beneficial because the vortices tend to persist as the breather air and vortical flow travel rearwards along the nacelle 30, driven by the air flow 44 past the engine 10. This means that the breather air is not able to coalesce with the air flow 44 or to contact the external surface 40 of the nacelle 30. Additionally, the use of vortical flow means that the flow rate of the clean air flow through the clean air outlet 46 may be relatively low because the vortex is driven and sustained by shearing forces. Therefore the vortical flow needs little or no boosting from its source pressure.

Figure 4:
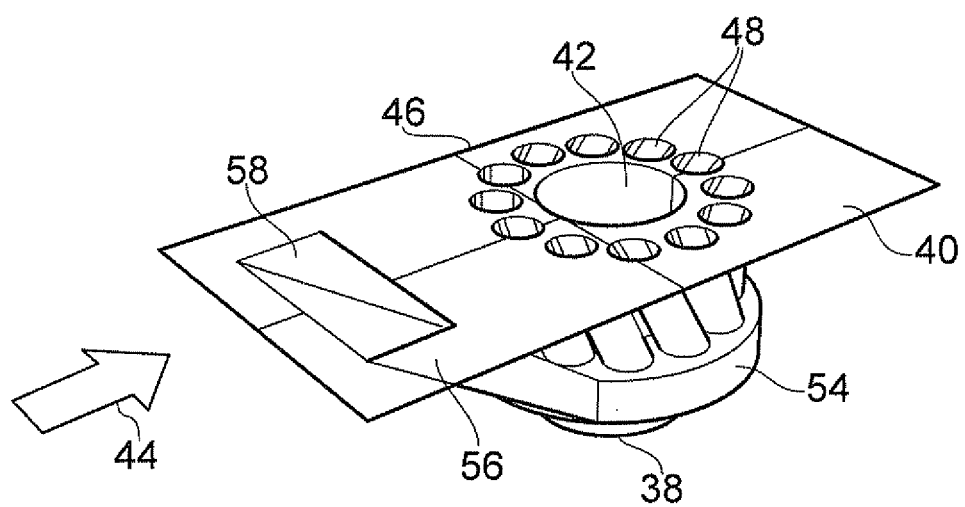
FIG. 4 is a schematic perspective view of the first embodiment of the breather duct shield having a local clean air intake in accordance with the present invention.

The clean air is supplied from any of a number of sources including the bypass duct 32 and bleed air from the engine 10, such as from the intermediate pressure compressor 16. Alternatively the clean air may be supplied from outside the engine 10, as shown in FIG. 4. Although the clean air supply is described with respect to the first embodiment of the present invention, it will be understood that the same supply mechanisms are applicable to the second embodiment of the present invention and to any modifications thereof within the scope of the claimed invention. The clean air angled outlet ducts 48 may be individually supplied from a source, for example the bypass duct 32, if each duct 48 opens into the source at one end and through the external surface 40 of the nacelle 30 at the other. Alternatively, the clean air supply may be brought to a common supply reservoir and the angled outlet ducts 48 open into the reservoir instead of the directly into the source.

In FIG. 4, the angled outlet ducts 48 terminate, at their distal ends to the external surface 40 of the nacelle 30, by opening into a reservoir 54 that supplies clean air to each angled outlet duct 48. The reservoir 54 is supplied via a supply duct 56 that connects the reservoir 54 with an intake port 58. In the illustrated embodiment, the intake port 58 is located in the external surface 40 of the nacelle 30 upstream of the breather exhaust port 42 and the clean air outlets 46. The intake port 58 may have any of a variety of known forms. For example, it may be a simple inclined slot, as illustrated in FIG. 4, that extends transversely to the air flow 44 past the engine 10. This arrangement of intake port 58 is short and light. Alternatively, the intake port 58 may be a NACA scoop intake, having the conventional form wherein the inlet becomes progressively deeper and wider in the direction of the inlet air flow 44. This arrangement of intake port 58 is longer and heavier than the inclined slot, but has a higher pressure recovery. A further alternative form of the intake port 58 is a small ram scoop intake that is oval or rectangular in cross-section and which is cheaper and easier to install than a NACA intake.

It will be appreciated by the skilled reader that any form of the intake port 58 may be used at the opening of the angled outlet ducts 48 or the annular outlet duct 50 into another clear air source such as the bypass duct 32. Alternatively, any other form of intake port 58 known to the skilled reader may be provided.

Although the breather duct 38 has been described as having circular cross-section, it may have any other cross-sectional shape necessary for the application. The clean air outlet 46 is preferably shaped in conformity to the breather duct 38 but may alternatively have a different shape.

Preferably the clean air outlet 46 is concentric with the exhaust port 42 of the breather duct 38. However, it may be offset so that it surrounds the exhaust port 42 and bounds it but is not concentric therewith. This may be beneficial in directing the expelled breather air and clean air flow in a downstream direction outside the nacelle 30 without significant mixing with the air flow 44 past the engine 10.

Although the reservoir 54 is depicted as annular and located around the breather duct 38 it may be located away from the breather duct 38 and have any shape desired, for example being cuboid to fit in a space within the nacelle 30. It may be easier to implement a remote reservoir 54 for the second embodiment of the clean air outlet 46 than the first embodiment since it has only one duct instead of a plurality.

The gas turbine engine 10 may be used for propulsion of an aircraft.

The supply of clean air may be modulated dependent on any one or more of the following factors: the environmental conditions, the mode of engine operation and the mode of operation of the vehicle, for example the aircraft, in which the gas turbine engine 10 is used.

Although, in the schematic view shown in FIG. 1, the outflow of breather air and clean air is shown as taking place at the bottom of the engine 10, it will be appreciated that the respective ports 42, 48 could be provided at any convenient position around the external surface 40 of the nacelle 30.

The invention claimed is:

1. A gas turbine engine comprising a nacelle and a breather duct providing communication between a component of the engine within the nacelle and the exterior of the nacelle, the breather duct opening at an exhaust port on the external surface of the nacelle such that the exhaust port is wholly within the plane of the nacelle, and at least one clean air outlet bounding the exhaust port and arranged to expel, in use, a vortical flow of clean air to form an aerodynamic barrier between the external surface of the nacelle and a flow of breather air expelled from the exhaust port.

2. A gas turbine engine as claimed in claim 1, wherein the component is an oil lubricated component.

3. A gas turbine engine as claimed in claim 1, wherein the component is a gearbox.

4. A gas turbine engine as claimed in claim 1, wherein the exhaust port is circular, and the clean air outlet is concentric with the exhaust port.

5. A gas turbine engine as claimed in claim 1, wherein the clean air outlet is annular and comprises angled vanes arranged to direct, in use, clean air to be expelled as the vortical flow.

6. A gas turbine engine as claimed in claim 1, wherein the clean air outlet comprises an annular array of angled outlet ducts arranged to direct, in use, clean air to be expelled as the vortical flow.

7. A gas turbine engine as claimed in claim 1, wherein the clean air is supplied to the clean air outlet from a bypass duct of the engine.

8. A gas turbine engine as claimed in claim 1, wherein the clean air is supplied to the clean air outlet from an intake close to the exhaust port.

9. A gas turbine engine as claimed in claim 8, wherein the intake comprises a slot.

10. A gas turbine engine as claimed in claim 8, wherein the intake comprises a NACA intake.

11. A gas turbine engine as claimed in claim 8, wherein the intake comprises a ram scoop intake.

12. A gas turbine engine as claimed in claim 1, wherein the supply of clean air is modulated dependent on any one or more of the following factors: the environmental conditions, the mode of engine operation and the mode of operation of the vehicle in which the gas turbine engine is used.

* * * * *